United States Patent [19]

Hirai

[11] Patent Number: 4,914,364

[45] Date of Patent: Apr. 3, 1990

[54] NUMERICAL CONTROL APPARATUS

[75] Inventor: Hayao Hirai, Aichi, Japan

[73] Assignee: Mitsubishi Denki Kabushiki Kaisha, Japan

[21] Appl. No.: 111,322

[22] Filed: Oct. 22, 1987

[51] Int. Cl.⁴ .............................................. G05B 11/18
[52] U.S. Cl. .................................... 318/590; 318/571; 318/573; 318/39; 318/568.22; 364/474.29
[58] Field of Search ................. 318/590, 571, 39, 573, 318/568; 364/171

[56] References Cited

U.S. PATENT DOCUMENTS

| | | | |
|---|---|---|---|
| 3,576,979 | 5/1971 | McCall | 235/151.11 |
| 3,656,124 | 4/1972 | McGee | 364/200 |
| 3,840,791 | 10/1974 | Mack | 318/571 |
| 4,387,327 | 6/1983 | Kralowetz et al. | 318/573 |
| 4,587,608 | 5/1986 | Kishi | 364/191 |
| 4,591,968 | 5/1986 | Nozawa et al. | 364/167 |

Primary Examiner—William M. Shoop, Jr.
Assistant Examiner—Saul M. Bergmann
Attorney, Agent, or Firm—Sughrue, Mion, Zinn, Macpeak & Seas

[57] ABSTRACT

Disclosed herein is a numerical control apparatus for controlling drive spindle heads in a rectangular coordinate system of machining apparatuses such as a lathe, a miller, a laser beam machining apparatus, an electric discharge machining apparatus, a robot and the like, to thereby perform positioning control.

5 Claims, 11 Drawing Sheets

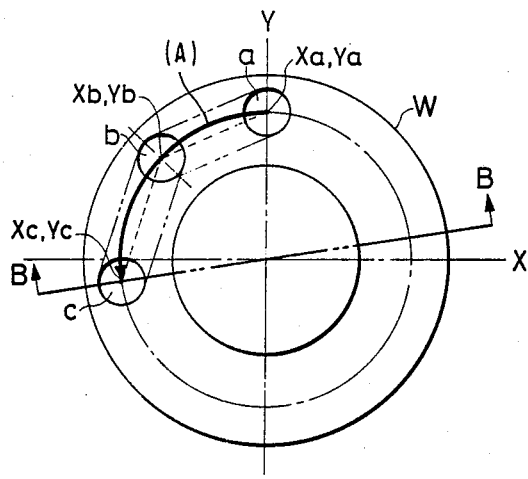
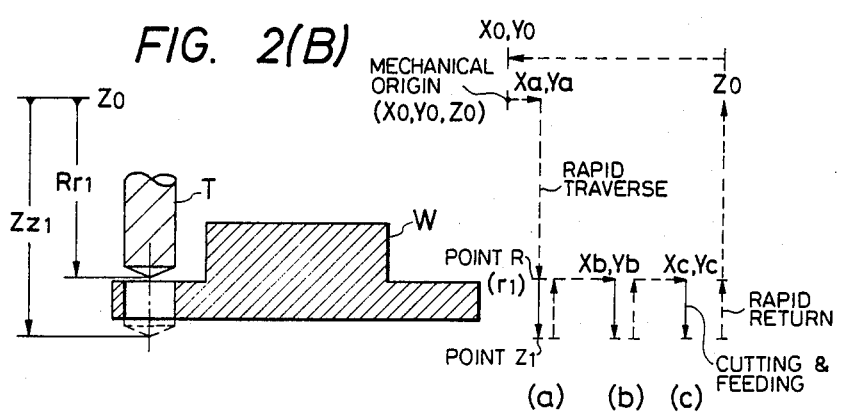

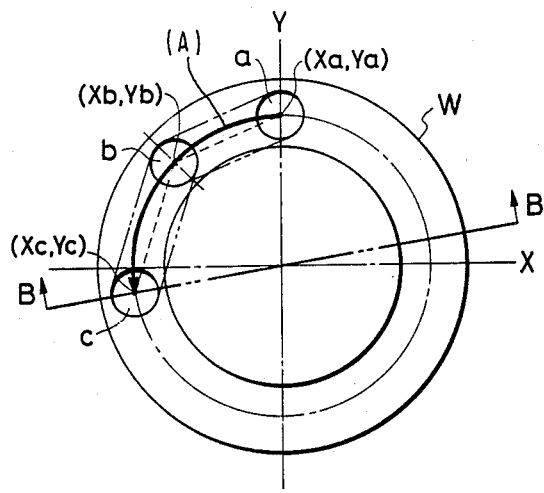
FIG. 3(A)
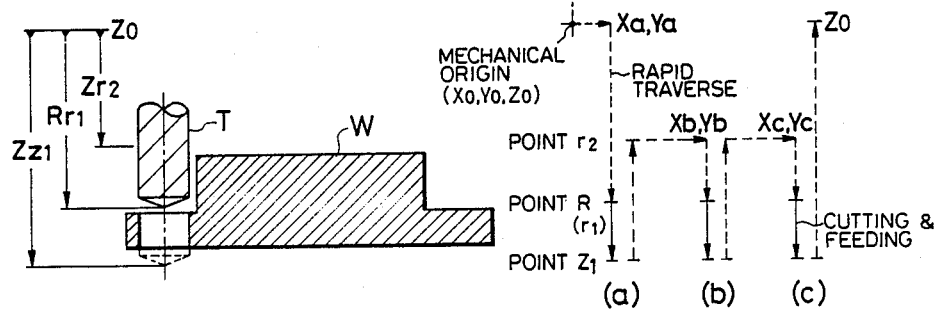
FIG. 3(B)
FIG. 3(C)

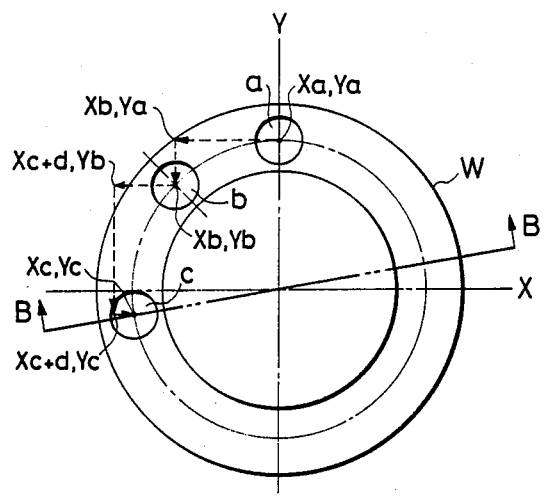
FIG. 4(A)
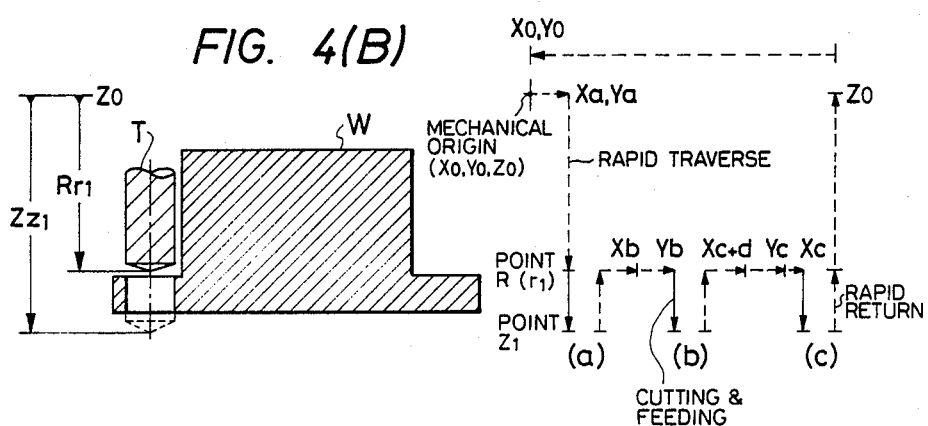
FIG. 4(B)
FIG. 4(C)

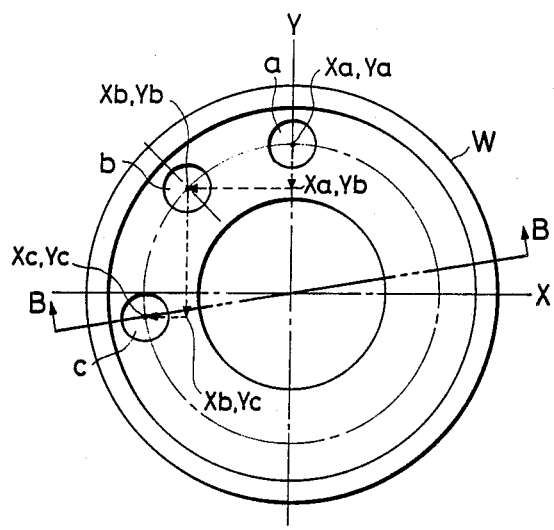
FIG. 5(A)
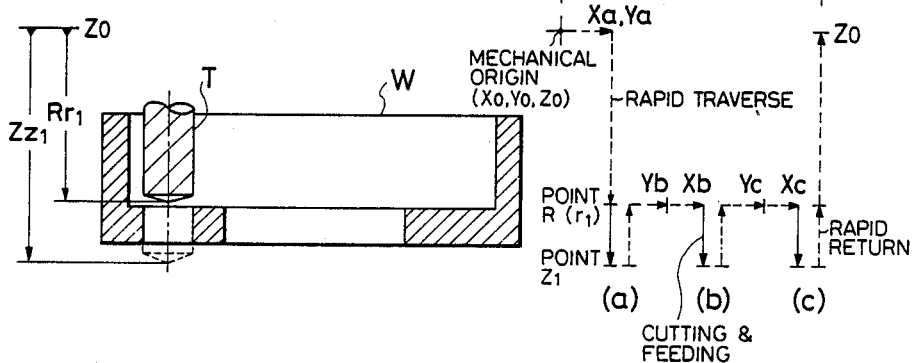
FIG. 5(B)
FIG. 5(C)

FIG. 6(A)
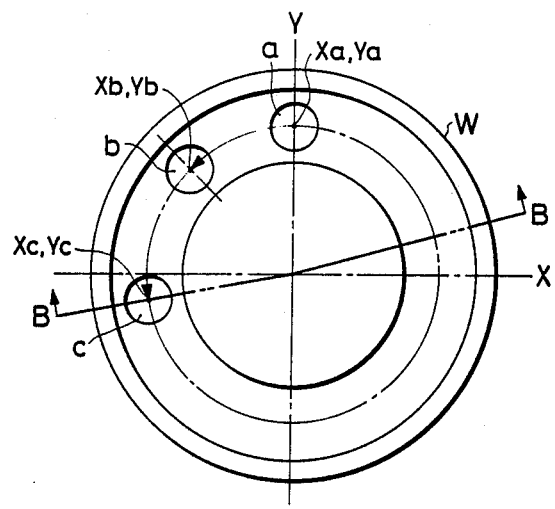
FIG. 6(B)
FIG. 6(C)
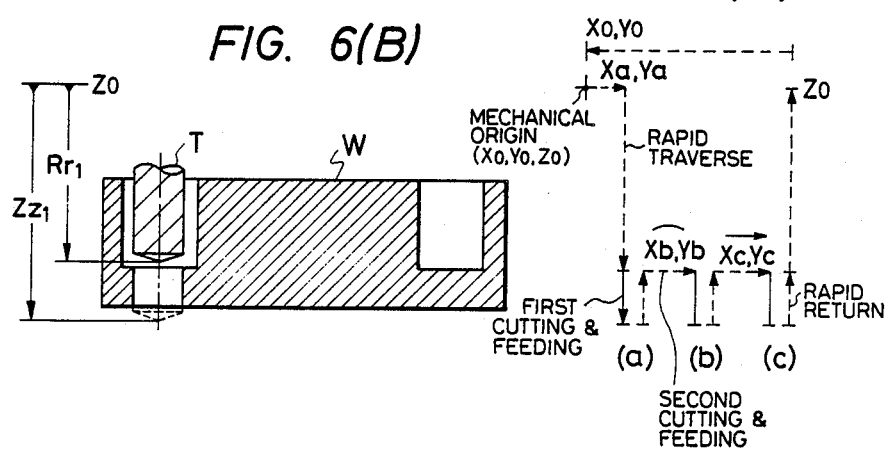

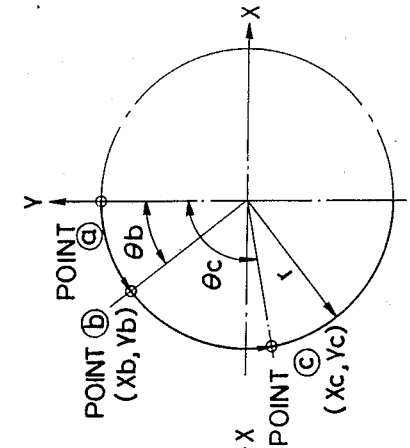
FIG. 7(1A)(CCW)  FIG. 7(2A)(CCW)  FIG. 7(3A)(CCW)
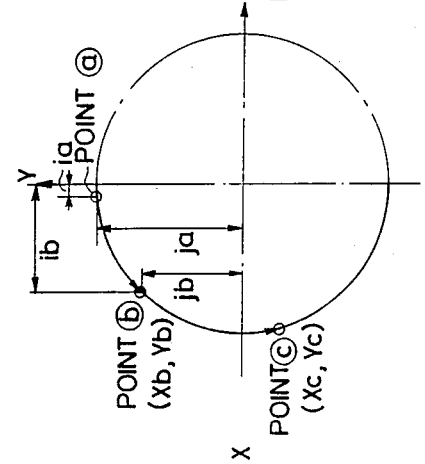
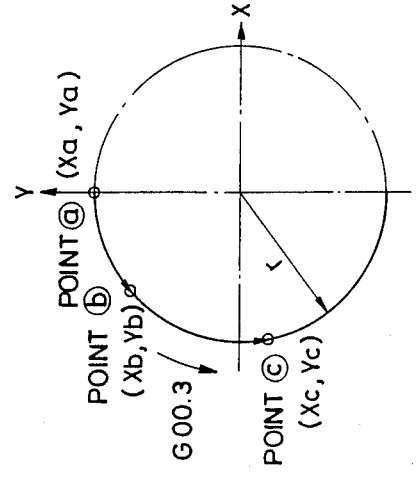
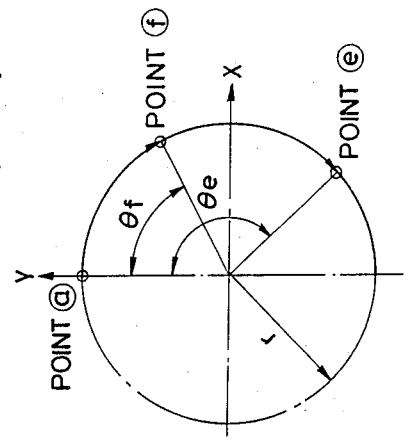
FIG. 7(1B)(CW)  FIG. 7(2B)(CW)  FIG. 7(3B)(CW)
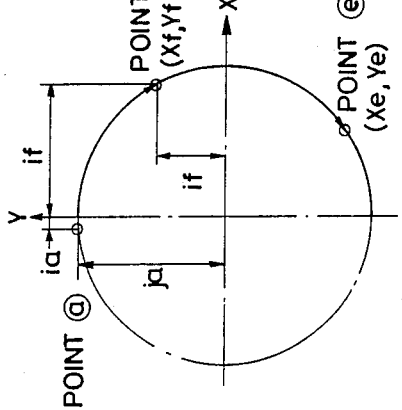
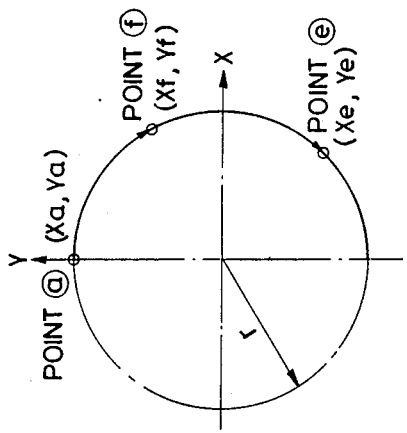

NUMERICAL CONTROL APPARATUS

BACKGROUND OF THE INVENTION

1. Field of the Invention

The present invention generally relates to a numerical control apparatus for controlling drive shafts in a rectangular coordinate system of machinery, such as a machine tool (lathe, miller, machining center, etc.), a laser beam machine, an electric discharge machine, a robot and the like, to thereby perform positioning control.

2. Description of the Prior Art

FIG. 1 shows a vertical-type machining center controlled by a numerical control apparatus. In the drawing, the reference numeral 1 designates a table for setting a work on it. The table 1 is movable in the directions of two coordinate axes, that is, the x-coordinate axis and the y-coordinate axis (hereinafter referred to as X-axis and axis respectively). The reference numeral 2 designates a main spindle head movable in the direction 0f the z-coordinate axis (hereinafter referred to as Z-axis). The main spindle head 2 is provided with a main spindle 3 which is disposed at the top end of the main spindle head 2 so that a tool supplied from a tool magazine 4 can be attached to the main spindle 3. The tool magazine 4 is arranged to stock various kinds of tools (T) in it. The reference numeral 5 designates a numerical control apparatus and a power control cabinet, and the reference numeral 6 designates an operating board.

In the case where a work is to be machined by use of such a machining center provided with a numerical control apparatus, the table 1 must be moved in the X- and Y-axis and the main spindle 2 must be moved in the Z-Y-axis so that the tool (T) attached to the main spindle 3 can be subject to positioning control relative to the work placed on the table 1. In other words, it is necessary that the tool (T) is controlled to come to a target position, such as a machining start point or the like, of the work.

The positioning control aims at preparing for machining the work and does not aim at machining the work. Accordingly, it is preferably that the tool is moved as fast as possible, relative to the table.

As positioning control in the prior art type numerical control apparatus, positioning control by means of a linearly positioning pass has been used or positioning control using a cutting feed mode has been required.

In the case of use of positioning control by means of a linearly positioning pass [EIA word address format: G005] can be made very fast (for example 12000 mm/min). In this case, however, the relative movement is substantially linear. Accordingly, any one of the following three movement forms must be used to generate a machining program, considering factors such as interference between the work and the tool and the like:

(A) Simultaneous biaxial control movement (Refer to FIGS. 2(A)–(C) and 3(A)–3(C));
(B) Simultaneous uniaxial outer-round movement (Refer to FIGS. 4(A)–4(C)); and
(C) Simultaneous uniaxial inner round movement (Refer to FIGS. 5(A)–5(C)).

In the case of use of positioning control (Refer to FIGS. G(A)–G(C) using cutting feed mode [in EIA word address format, G01: linearly cutting, G02: circular-arcuate clockwise (right-handed) cutting G03: circular-arcuate counterclockwise left-handed cutting, and the like], the movement of the tool (T) relative to the work not only may be linear, but may be right- or left-handed. However, as speed increases, delay of a servo system with respect to control command increases to exceed an allowable error so that a protective circuit operates for emergency stop. Accordingly, in general, cutting feed mode cannot be used at a speed higher than 5000 mm/min.

In the following, the aforementioned positioning controls are described more in detail to facilitate the understanding as to what form and what size the work should have in various cases where the positioning controls are applied to the work.

In the case where drilling is carried out in the work (W) as shown in FIGS. 2(A) and 2(B), and more particularly, in the case wherre drilling points are determined so that the tool (T) is out of touch with the outside wall of the work (W) even when the top of the tool (T) takes the shortest route to move linearly from the drilling start point (Xa, Ya, Zr$_1$) to the next drilling start point (Xb, Yb, Zr$_1$) relative to the work (W), a machining program using linear positioning pass by means of simultaneously biaxial control movement is generated to establish such a machining pass as shown in FIGS. 2(A) and 2(C).

In this case, when the co-ordinates and sizes of respective parts are determined as shown in FIGS. 2(A) to 2(C), a typical example of the machining program is as follows.

| <PROGRAM> | <OPERATION> |
|---|---|
| N001 G28 x$_0$ y$_0$ z$_0$ | Check machine origin. |
| N002 G90 | Set absolute coordinate system. |
| N003 Tw M06 | Replace tool by No.n. Preset tool length. |
| N004 Sn M03 | Start n r.p.m. forward rotation of main spindle. |
| N005 G99 | Designate to return to point R. |
| N010 G00 Xx$_a$ Yy$_a$ | Rapid traverse to first machining start point a. Positioning. |
| N011 G81 Zz$_1$ Rr$_1$ Ff$_1$ | Drilling by fixed cycle G81. Return to point R. |
| N020 Xx$_b$ Yy$_b$ | Rapid traverse to point b. Positioning. Drilling by fixed cycle G81. Rapid return to point R. |
| N030 Xx$_c$ Yy$_c$ | Rapid traverse to point c. Positioning. Drilling by fixed cycle G81. Rapid return to point R. |
| N040 G80 | Cancel G81. |
| N041 G28 Z$_o$ | Rapid return to the origin of z-axis. |
| N042 G28 X$_o$ Y$_o$ | Rapid return to the origin of x- and y-axes. |
| N043 M30 | Program end. Rewind tape. |

In the case where drilling is executed in the work (W) as shown in FIGS. 3(A) and 3(B), and more particularly, in the case where drilling points are determined so that the tool (T) comes in contact with the outside wall of the work (W) when the top of the tool (T) takes the shortest route to move linearly from the drilling start point (Xa, Ya, Zr$_1$) to the next drilling start point (Xb, Yb, Zr$_1$) relative to the work (W), a machining program using linearly positioning pass by measn of simultaneously biaxial control movement (A) is generated to establish such a machining pass as shown in FIGS. 3(A) and 3(C).

In this case, when the co-ordinates and sizes of respective parts are determined as shown in FIGS. 3(A)

to 3(C), a typical example of the machining program is as follows.

| <PROGRAM> | <OPERATION> |
|---|---|
| N001 G28 $x_o$ $y_o$ $z_o$ | Check machine origin. |
| N002 G90 | Set absolute coordinate system. |
| N003 Tn M06 | Replace tool by No.n. Preset tool length. |
| N004 Sn M03 | Start $n$ r.p.m. forward rotation of main spindle head. |
| N010 G0 $Xx_a$ $Yy_a$ | Rapid traverse to first machining start point a. Positioning. |
| N011 G0 $Zr_1$ | Rapid traverse to point R. |
| N012 G1 $Zz_1$ $Ff_1$ | Cutting and feeding at $f_1$ mm/min to point $z_1$. |
| N013 G0 $Zr_2$ | Rapid return to point $r_2$. |
| N020 G0 $Xx_b$ $Yy_b$ | Simultaneously biaxial rapid traverse to point b. Positioning. |
| N021 G0 $Zr_1$ | Rapid traverse to point R. |
| N022 G1 $Zz_1$ | Cutting feed drilling at $f_1$ mm/min and feeding to point $z_1$. |
| N023 G0 $Zr_2$ | Rapid return to point $r_2$. |
| N030 G0 $Xx_c$ $Yy_c$ | Simultaneously biaxial rapid traverse to point c. Positioning. |
| N031 G0 $Zr_1$ | Rapid traverse to point R. |
| N032 G1 $Zz_1$ | Cutting feed drilling at $f_1$ mm/min and feeding to point $z_1$. |
| N040 G28 $Z_o$ | Rapid return to the origin of z-axis. |
| N041 G28 X0 Y0 | Rapid return to the origin of x- and y- axes. |
| N042 M30 | Program end. Rewind tape. |

In the case where drilling is executed in the work (W) as shown in FIGS. 4(A) and 4(B), and more particularly, in the case where drilling points are determined so that the tool (T) comes in contact with the outside wall of the work (W) if the top of the tool (T) takes the shortest route to move linearly from the drilling start point (Xa, Ya, $Zr_1$) to the next drilling start point (Xb, Yb, $Zr_1$) relative in the work (W), and so that machining time is prolonged if the aforementioned machining pass (in which the tool can be escaped in the z-axis so as not to interfere with the work at the time of linearly positioning) as shown in FIGS. 3(A)-3(C) is employed, a machining program using linear positioning pass by means of a simultaneously uniaxial and outward rotation (b) is generated to establish such a machining pass as shown in FIGS. 4(A) and 4(C).

In this case, when the co-ordinates and sizes of respective parts are determined as shown in FIGS. 4(A) to 4(C), a typical example of the machining program is as follows.

| <PROGRAM> | <OPERATION> |
|---|---|
| N001 G28 $x_o$ $y_o$ $z_o$ | Check machine origin. |
| N002 G90 | Set absolute-value coordinate system. |
| N003 Tn M06 | Replace tool by No.n. Preset tool length. |
| N004 Sn M03 | Start $n$ r.p.m. forward rotation of main spindle head. |
| N005 G99 | Set to return to point R. |
| N010 G00 $Xx_a$ $Yy_a$ | Rapid traverse to first machining start point a. Positioning. |
| N011 G81 $Zz_1$ $Rr_1$ $Ff_1$ | Drilling by fixed cycle G8$_1$. Rapid return to point R. |
| N012 G80 | Cancel fixed cycle G81. |
| N020 G00 $Xx_b$ | Rapid traverse the x-coordinate to point b. |
| N021 G81 $Yy_b$ $Zz_1$ $Rr_1$ $Ff_1$ | Rapid traverse the y-coordinate to point b. Positioning. Drilling by fixed cycle G81. Rapid traverse to point R. |
| N022 G80 | Cancel fixed cycle G81. |
| N030 G00 $Xx_c + \alpha$ | Rapid traverse the x-coordinate to point c'. |
| N031 G00 $Yy_c$ | Rapid traverse the y-coordinate to point c. |
| N032 G81 $Xx_c$ $Zz_1$ $Rr_1$ $Ff_1$ | Rapid traverse the x-coordinate to point c. Positioning. Drilling by fixed cycle G81. Rapid traverse to point R. |
| N033 G80 | Cancel fixed cycle G81. |
| N040 G28 $Z_o$ | Rapid return to the origin of z-axis. |
| N041 G28 $X_o$ $Y_o$ | Rapid return to the origin of x- and y-axes. |
| N042 M30 | Program end. Rewind tape. |

In the case where drilling is carried out in the work (W) as shown in FIGS. 5(A) and 5(B), and more particularly, in the case where drilling points are determined so that the tool (T) may impair the inside wall of the work (W) if the top of the tool (T) takes the shortest route to move linear from the drilling start point (Xad, Ya, $Zr_1$) to the next drilling start point (Xb, Yb, $Zr_1$) relative to the work (W), and so that machining time may be prolonged if the aforementioned machining pass (in which the tool can escape in the z-coordinate axis so as not to interfere with the work at the time of linear as not to interferre with the work at the time of linear positioning as shown in FIGS. 3(A)-3(C) is employed, a machining program using linear positioning pass by means of simultaneously uniaxial and inward rotation (c) is generated to establish such a machining pass as shown in FIGS. 5(A) and 5(C).

In this case, when the co-ordinates and sizes of respective parts are determined as shown in FIGS. 5(A) to 5(C), a typical example of the machining program is as follows.

| <PROGRAM> | <OPERATION> |
|---|---|
| N001 G28 $x_o$ $y_o$ $z_o$ | Check machine origin. |
| N002 G90 | Set absolute-value coordinate system. |
| N003 Tn M06 | Replace tool by No.n. Preset tool length. |
| N004 Sn M03 | Start $n$ r.p.m. forward rotation of main spindle head. |
| N005 G99 | Set to return to point R. |
| N010 G00 $Xx_a$ $Yy_a$ | Rapid traverse to first machining start point a. Positioning. |
| N011 G81 $Zz_1$ $Rr_1$ $Ff_1$ | Drilling by fixed cycle G81. Rapid return to point R. |
| N012 G80 | Cancel fixed cycle G81. |
| N020 G00 $Yy_b$ | Rapid traverse the x-coordinate to point b. |
| N021 G81 $Xx_b$ $Zz_1$ $Rr_1$ $Ff_1$ | Rapid traverse the y-coordinate to point b. Positioning. Drilling by fixed cycle G81. Rapid traverse to point R. |
| N022 G80 | Cancel fixed cycle G81. |
| N030 G00 Yyc | Rapid traversae the y-coordinate to point c. |
| N031 G81 Xxc $Zz_1$ $Rr_1$ $Ff_1$ | Rapid traverse the x-coordinate to point c. Positioning. Drilling by fixed cycle G81. Rapid traverse to point R. |
| N032 G80 | Cancel fixed cycle G81. |
| N040 G28 $Z_o$ | Rapid return to the origin of z-axis. |
| N041 G28 $X_o$ $Y_o$ | Rapid return to the origin of x- and y-axes. |
| N042 M30 | Program end. Rewind tape. |

In the case where drilling is executed in the work (W) as shown in FIGS. 6(A) and 6(B), and more particularly, in the case where drilling points are determined so that the tool (T) may comes in contact with the outside or inside wall of the work (W) if the top of the tool (T) is moved from the drilling start point (Xa, Ya, Zr$_1$) to the next drilling start point (Xb, Yb, Zt$_1$) by use of any linearly positioning pass of simultneously biaxial control movement of FIGS. 2(A)–2(C), simultaneously uniaxial and outside rotation of FIGS. 4(A)–4(C), simultaneously uniaxial and inside rotation of FIGS. 5(A)–5(C), and so that machining time may be prolonged if the aforementioned machining pass (in which the tool can escape in the z-coordinate axis so as not to interfere with the work at the time of linearly positioning) as shown in FIGS. 3(A)–3(C) is employed, a machining program using a cutting feed mode is generated to establish such a circular-arcuate machining pass as shown in FIGS. 6(A) and 6(C).

In this case, when the co-ordinates and sizes of respective parts are determined as shown in FIGS. 6(A) to 6(C), a typical example of the machining program is as follows.

| <PROGRAM> | <OPERATION> |
|---|---|
| N001 G28 x$_0$ y$_0$ z$_0$ | Check machine origin. |
| N002 G90; | Set absolute-value coordinate system. |
| N003 Tn M06; | Replace tool by No.n. Preset tool length. |
| N004 Sn M03; | Start $\underline{n}$ r.p.m. forward rotation of main spindle head |
| N005 G99; | Set to return to point R. |
| N010 G00 Xx$_a$ Yy$_a$; | Rapid traverse to first machining start point $\underline{a}$. Positioning. |
| N011 G81 Zz$_1$ Rr$_1$ Ff$_1$; | Drilling by fixed cycle G81. Rapid return to point R. |
| N012 G80; | Cancel fixed cycle G81. |
| N020 G03 Xx$_b$ Yy$_b$ Rr Ff$_0$; | Positioning in arc-like cutting mode to point $\underline{b}$. |
| N021 G81 Zz$_1$ Rr$_1$ Ff$_1$; | Drilling by fized cycle G81. Rapid traverse to point R. |
| N022 G80; | Cancel fixed cycle G81. |
| N030 G03 Xx$_c$ Yy$_c$ Rr Ff$_0$; | Positioning in arc-like cutting mode to point $\underline{c}$. |
| N031 G81 Zz$_1$ Rr$_1$ Ff$_1$; | Drilling by fixed cycle G81. Rapid tranverse to point R. |
| N032 G80; | Cancel fixed cycle G81. |
| N040 G28 Z$_0$; | Rapid return to the origin of z-axis |
| N041 G28 X$_0$Y$_0$; | Rapid return to the origin of x- and y-axes. |
| N042 M30; | Program end. Rewind tape. |

It is a matter of course that the positioning control usign the aforementioned cutting feed mode can be used for machining the work (W) as shown in FIGS. 2(A)–2(C) to FIGS. 5(A)–5(C).

As described above, in the conventional numerical control apparatus, any one of the four positioning control methods has been used to generate a machining program, considering shape and size of the work, positioning time and the like.

When the positioning control using linear positioning pass is used, the tool (T) can be moved relative to the work (W) at high speed (for example 12000 mm/min). However, the work (W) and the tool (T) interfere with each other at the time of positioning as shown in FIGS. 2(A)–2(C) to FIG. 6(A)–6(C). in the case where the tool (T) must be free from the work (W) in any direction of X-, Y- and Z- axes in order to acclimate the interference, the migration distance of the tool relative to the work at the time of positioning may be considerably enlarged. Further, the number of migration passes would be increased relative to positioning by means of the cutting feed mode. For exaqmple, when the work (W) used is as shown in FIGS. 6(A) and 6(B) and has its U-groove considerably deep, the aforementioned problem exists.

Accordinly, considering positioning lag time (for example, G01, G02, G03: 0.1 sec per pass, G00: 0.6 sec per pass), a large amount of time is often required for positioning.

When the positioning control using linear positioning pass is used in the cause where drilling is made in the work (W) as shown in FIGS. 6(A) and 6(B), 13 migration passes are required (rapid traverse: 10 passes, cutting feed: 3 passes). On the other hand, when the positioning control by means of the cutting feed mode is used, the number of migration passes is 11 (rapid traverse: 6 passes, first cutting feed: 3 passes, second cutting feed (maximum speed for positioning): 2 passes).

In the case where the work (W) as shown in FIGS. 6(A)–6(C) or other figures is to be machined by use of the positioning control using the cutting feed mode, the tool can be moved along a circular or circular-arcutate pass relative to the work. Accordingly, it is unnecessary to free the tool (T) from the work (W) in any direction of X, Y and Z axes to prevent interference at the time of positioning. Accordingly, the migration distance of the tool (T) relative to the work (W) at the time of positioning can be shortened, and the number of migration passes can be reduced. However, as described above, the speed is limited to about 5000 mm/min at the maximum, so that a large amount of time is often required for positioning according to the form, size and the like of the work (W). For example, when the work (W) used is as shown in FIGS. 6(A)–6(C) and has its U-groove is considerably deep, and the drilling positions disposed in a circle are far away from each other, the aforementioned problem exists.

In the case where the positioning control using the cutting feed mode is used, it is apparent from the aforementioned machining program that a loto of procedures, such as feed-input setting at the time of positioning circular-arcuate pass [Hf$_0$ in sequence number N020 and n030; Ff$_0$ is often set to be the maximum speed (for example 5000 mm/min) to make positioning speedy], feed-imput setting again in the next cutting block [Hf$_1$ in sequence number N021 and N031; [Hf$_1$ is often set to be the lower speed (for example 200 mm/min) consideration of the machining, the breakdown of the tool and the like] and the, are required. Accordingly, a problem exists in that there is the possibility of increasing numerical values inputted in the program, omitting check at the time of program check, and the like.

SUMMARY OF THE INVENTION

It is therefore an object of the present invention to solve the above problems in the prior art.

It is another object of the present invention to provide a numerical control apparatus in which rapid-traverse positioning can be performed even along a circular or circular-arcuate pass so that machining time can be shortened.

It is further object of the present invention to provide a numerical contrrol apparatus in which the entry of a machining program by means of an EIA word address format for a circular or circular-arcuate pass can ve made very simply.

To attain the above objects, the numerical control apparatus according to the present invention is provided with means for moving a tool or the like relative to a work or the like in a rapid-traverse circular-arcuate pass mode.

More particularly, the numerical control apparatus according to the present invention comprises: a determining means for determining whether an instruction in a machining program relates to a rapid-traverse circular-arcuate pass mode or not; a computation means for computing a distance by which each of servomotors is caused to move per unit time inthe rapid-traverse circular-arcuate pass mode, when the determining means proving that the instruction in themachining program relates to the rapid-traverse circular-arcuate pass mode; and a servomotor control means for generating a signal for controlling each of the servomotors in accordance with the result of the computation by the computation means to cause the servomotors to perform the relative positioning in the rapid-traverse circular-arcuate pass mode.

Accordingly, the tool of the like can be speedily moved relative to the work or the like along a circular or circular-arcuate pass with no interference with the work or the like.

BRIEF DESCRIPTION OF THE DESCRIPTION OF THE DRAWING

Above and other objects, features and advantages of the present invention will appear more fully from the following description in conjunction with the accompanying drawings, in which:

FIG. 1 is a view showing an example of a machine tool to which the present invention is applied;

FIGS. 2(A)-2(C) to FIGS. 6(A)-6(C) are views showing works and machining passes for explaining the prior art, in which FIG. 2(A) is a plan view of a first work, FIG. 2(B) is a sectional view taken along the line B—B of FIG. 2(A), FIG. 2(C) is a view showing the machining pass of the first work, FIG. 3(A) is a plan view of a second work, FIG. 3(B) is a sectional view taken along the line B—B of FIG. 3(A), FIG. 3(C) is a view showing the machining pass of the second work, FIG. 4(A) is a plan view of a third work, FIG. 4(B) is a sectional view taken along the line B—B of FIG. 4(A), FIG. 4(C) is a view showing the machining pass of the third work, FIG. 5(A) is a plan view of a fourth work, FIG. 5(B) is a sectional view taken along the line B—B of FIG. 5(A), FIG. 5(C) is a view showing the machining pass of the fourth work, FIG. 6(A) is a plan view of a fifth work, FIG. 6(B) is a sectional view taken along the line B—B of FIG. 6(A), and FIG. 6(C) is a view showing the machining pass of the fifth work; FIGS. 7(1A)-7(3B) are diagrams showing the best machining pass in the case where drilling is carried out in the work having the shape as shown in FIGS. 6(A) and 6(B) according to an embodiment of the present invention;

FIG. 8 is a block diagram showing the hardware of the embodiment;

FIGS. 9(A)-9(B) are flow charts for explaining the operation of the embodiment;

FIG. 12 is a view for explaining the prior art.

DETAILED DESCRIPTION OF THE PREFERRED EMBODIMENT

Figure 1:
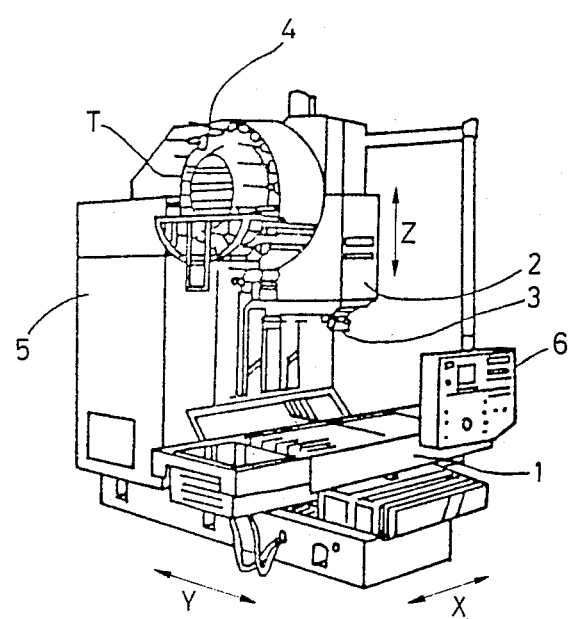

The feature of the present invention is in that there is newly provided means in which, for example, when such a work as shown in FIGS. 6(A)-6(B) is to be machined, a tool is moved along a circular or circular-arcuate pass relative to the work for exampole at a high speed of, for example, 10000 mm/min to thereby make speedy positioning possible.

FIGS. 7(1A)-7(3B) are diagrams showing the best positioning passes in the case where a work (W) having such outside and inside walls as shown in FIG. 6(B) requires drilling in the bottom between the inside and outside walls.

FIGS. 7(1A), 7(2A) and 7(3A) show the best positioning pass in the case where the work (W) is bored successively at the drilling positions (a), (b) and (c). In this case, if the tool (T) is linearly moved between the points (a) and (b) and between the points (b) and (c) relative to the work (W), the tool (T) and the work (W) interfere with each other. Accordingly, the arc ab and the arc bc are the best passes for minimizing the positioning distance without interference.

FIGS. 7(1B), 7(2B) and 7(3B) show the best positioning pass in the case where the work (W) is bored sucessiv ely at the drilling positions (a), (f) and (e). Also in this case, the arc af and the arc fe are the best passes, considering interference between the tool (T) and the work (W) and positioning distance.

In order to attain speedy positioning by the numerical control apparatus by use of such circular-arcuate passes, that is, in order to make the numerical control apparatus recognize speedy positioning by means of such circular-arcuate passes, codes used in the machining program are predetermined as follows.

G00.2—rapid-traverse CW circular-arcuate passes
G00.3—rapid-traverse CCW circular-arcuate passes
G02.0—rapid-traverse CW circular-arcuate passes
G03.0—rapid-traverse CCW circular-arcuate passes
G02.1—rapid traverse CW arc equalized positioning
G03.1—rapid-traverse CCW arc equalized positioning The positioning words G02.1 and G03.1 are provided to set positions at equal distances by one instruction at the time of generation of the machining program in the case where equalized positioning must be required.

Although the aforementioned arrangement is made based on "G" codes, that is, based on preparation functions ISO/EIA word address format, there is no other reason than the programmer will be accustomed to using "G" codes. Accordingly, it is a matter of course that other codes may be used for such arrangement.

For example, in the case where address values connected to the "G" codes express co-ordinates and radius [FIGS. 7(1A) and 7(1B)], the address values are as follows.

Positioning to point (b)—G00.3 $Xx_b$ $Yy_b$ $R_r$;
Positioning to point (c)—G00.3 $Xx_c$ $Yy_c$ $R_r$;
Positioning to point (f)—G00.2 $Xx_f$ $Yy_f$ $R_r$;
Positioning to point (e)—G00.2 $Xx_e$ $Yy_e$ $R_r$.

For example, in the case where address values express co-ordinates and x- and y-components [FIGS. 7(2A) and 7(2B)], the address values are as follows.

Positioning to point (b)—G00.3 $Xx_b$ $Yy_b$ $Ii_a$ $Jj_a$;
Positioning to point (c)—G00.3 $Xx_c$ $Yy_c$ $Ii_b$ $Jj_b$;
Positioning to point (f)—G00.2 $Xx_f$ $Yy_f$ $Ii_a$ $Jj_a$;
Positioning to point (e)—G00.2 $Xx_e$ $Yy_e$ $Ii_f$ $Jj_f$.

For example, in the case where address values express angle from reference point (a) and radius [FIGS. 7(3A) and 7(3B)], the address values are as follows.

Positioning to point (b) —G00.3 $\theta_{\theta b}$ Rr;
Positioning to point (c) —G00.3 $\theta_{\theta c}$ Rr;
Positioning to point (f) —G00.2 $\theta_{\theta f}$ Rr;
Positioning to point (e) —G00.2 $\theta_{\theta e}$ Rr;

When a machining program is generated by using the aforementioned address values and is inputted into the numerical control apparatus, the numerical control apparatus is arranged to set positions by using high-speed circular-arcuate passes according to the words.

On the other hand, for positioning using high-speed circular-arcuate passes, the numerical control apparatus is constructed as follows.

Figure 8:
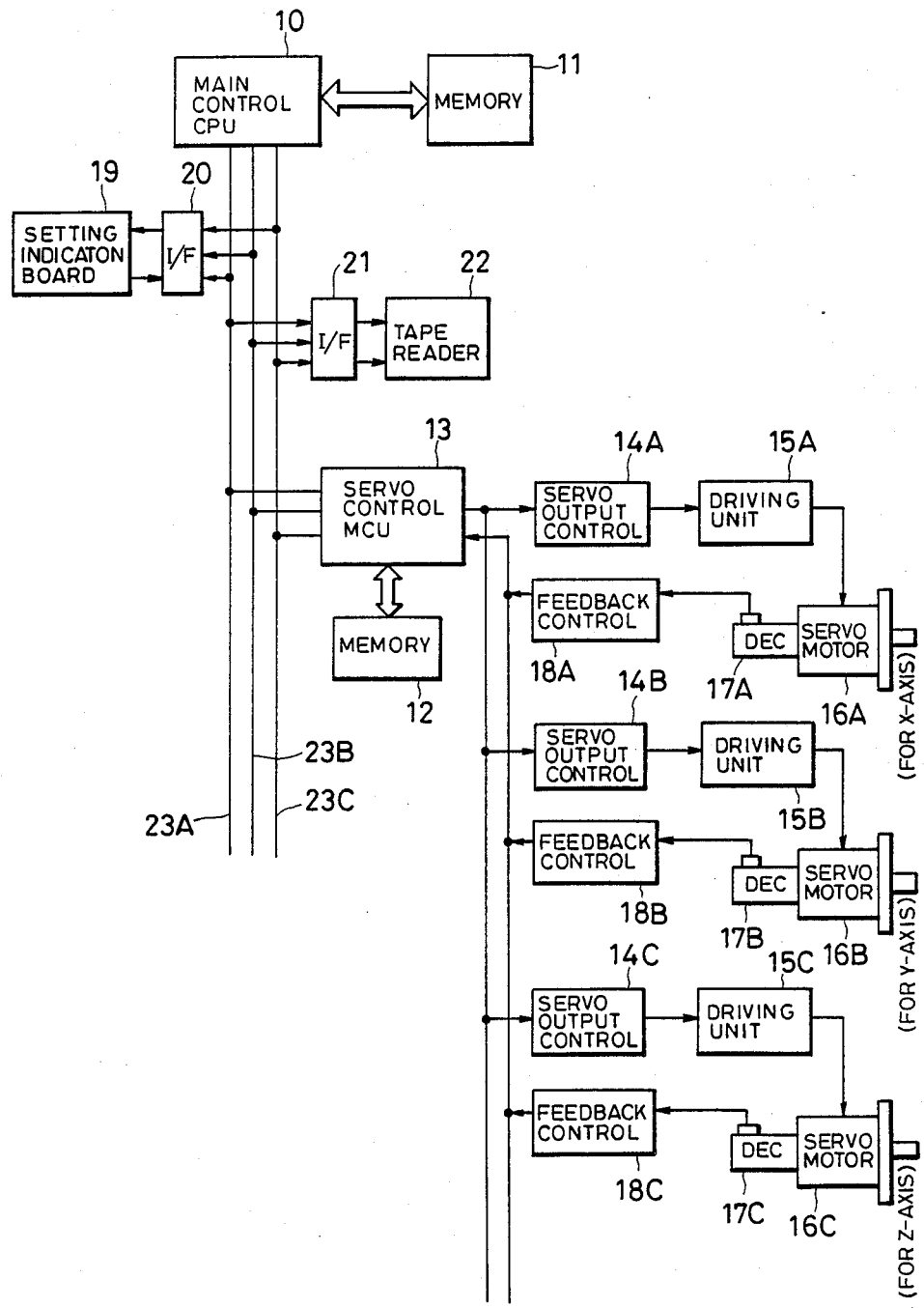

FIG. 8 is a diagram showing the handware of the numerical control apparatus for executing positioning with a high-speed circular-arcuate pass. In the drawing, the reference numeral 10 designates a main control (CPU), the reference numerals 11 and 12 designate memories, the reference numeral 13 designates a servo control (MCU), the reference numerals 14A, 14B and 14C designated servo output controls, the reference numerals 15A, 15B and 15C designate driving units, the reference numerals 16A, 16B and 16C designate servomotors for driving X-,Y, and Z-axes, the reference numerals 17A, 17B and 17C designate detectors for the respective servomotors, the reference numerals 18A, 18B and 18C designate feedback controls, and the reference numeral 19 designates a setting-indication board composed of a CRT and a key board whereby various kinds of parameters can be set up. The reference numerals 20 and 21 designate interfaces, and the reference numeral 22 designates a tape reader for inputting the machining program. Of course, the machining program may be inputted from the setting-indication board 19 or from other devices. such as a floppy disk drive unit (not shown) or the like. The reference numeral 23A designates a control line, the reference numeral 23B designates an address line, and the reference numeral 23C designates a data line. Devices, such as a sequence control, a printer and the like, which are not shown because they do not directly relate to the present invention, are connected to the lines.

The aforementioned hardware constructions is very general as that of a numerical control apparatus.

Figure 9A:
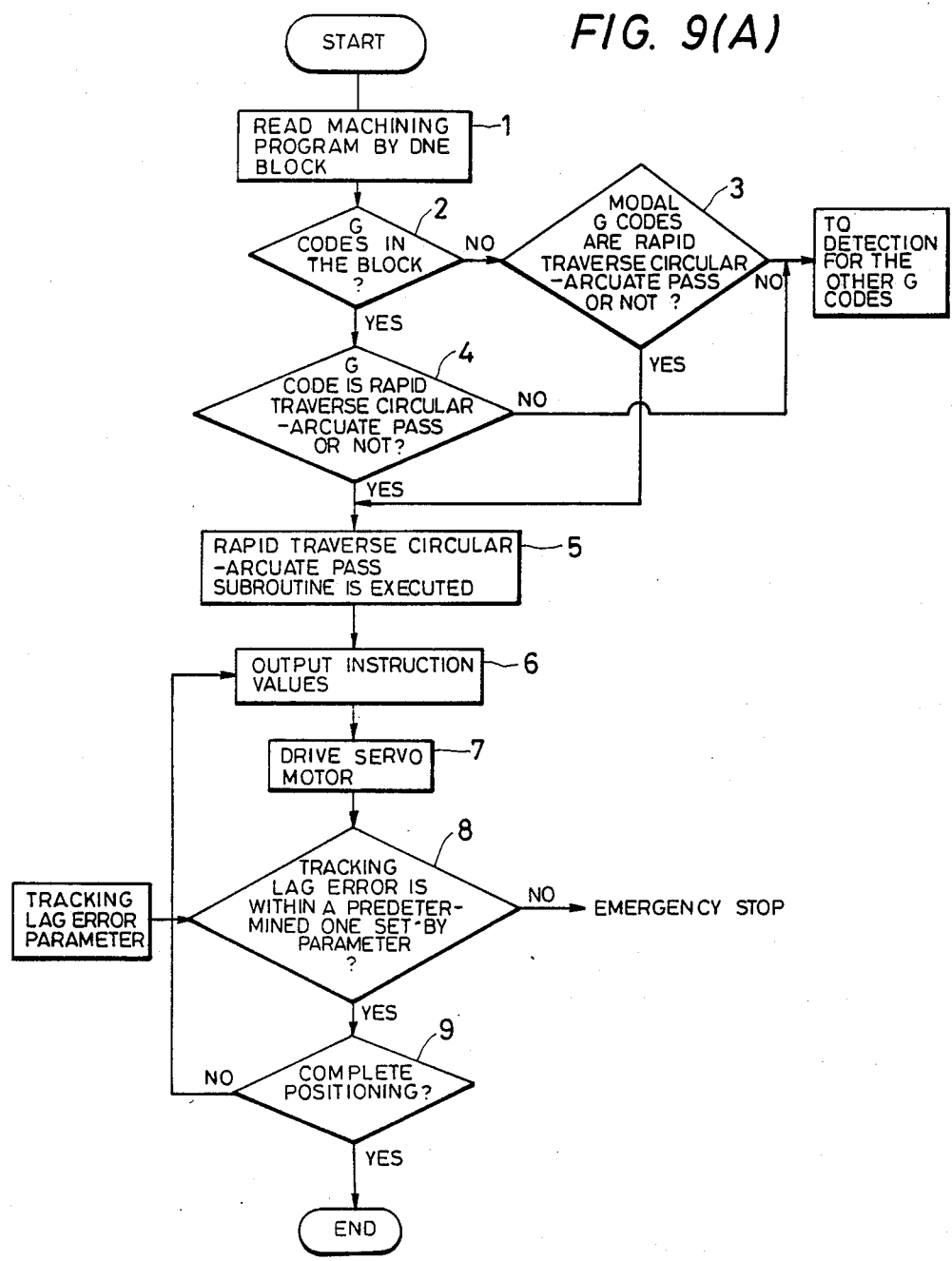
Figure 9B:
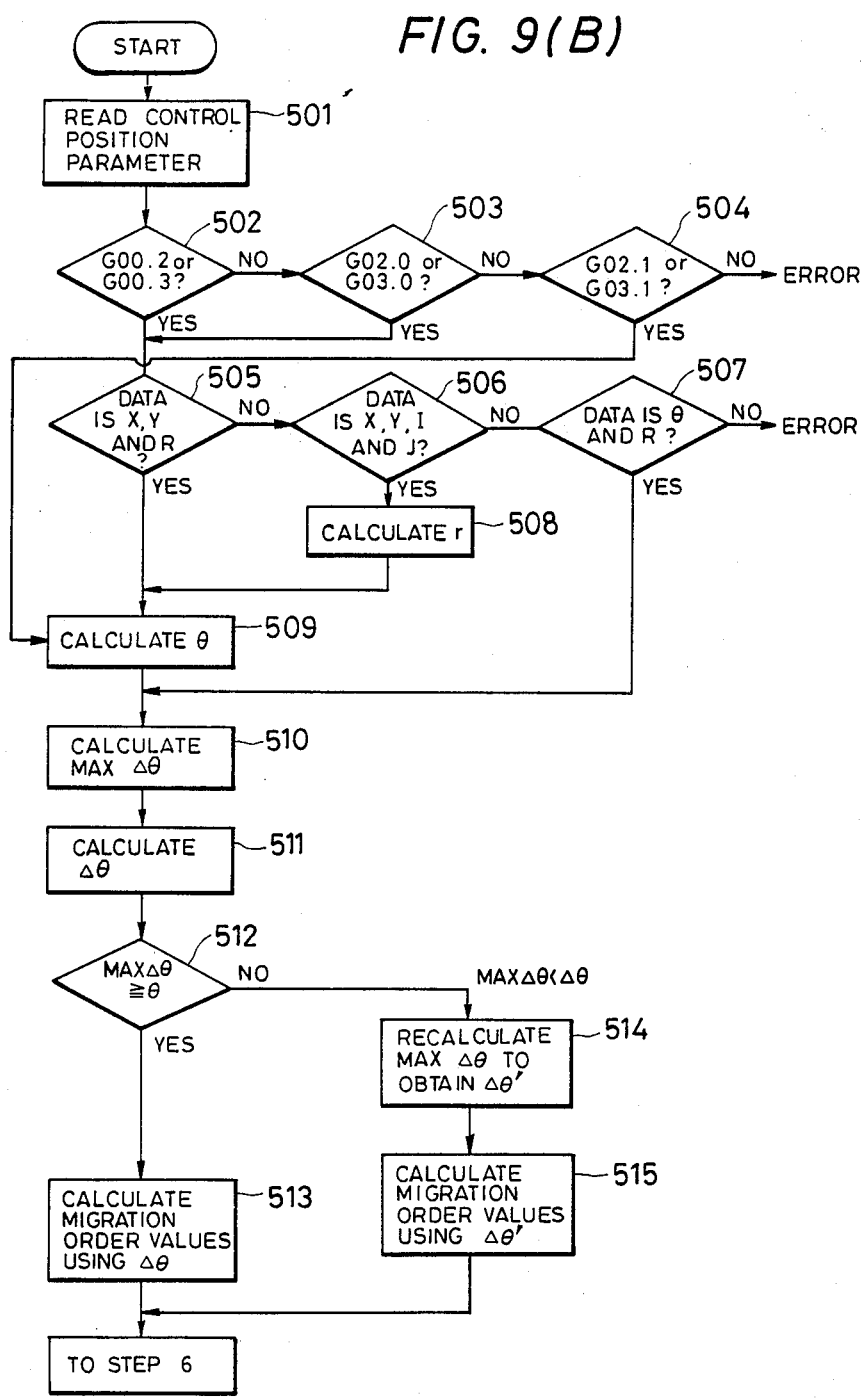

The control position error parameter exclusively used for rapid-traverse circular-arcuate pass can be inputted into the memory 11 from the setting-indication board 19, the delay error parameter can be inputted into the memory 12 from the board 19, and the software as shown in FIGS. 9(A) and 9(B) can be stored in the memory 11.

The control position error parameter stated herein means a parameter for expressing the distance between the tool (T) and the wall surface of the work (W), the parameter provided to prevent them from interfering with each other when the tool (W) as shown in FIG. 6(B) is moved along an circular-arc from the drilling positions a to the drilling position b relative to the work (W), consequently the parameter is used to decide a migration order value which will be described later. More particularly, for example if the clearance is 1 mm, a parameter "1" is inputted from the board 19.

Of course, it is sufficient if the condition of the above-mentioned clearance can be detected, and therefore it is needless to say that, for example, the diameter of the tool and the distance between the inner and outer walls of the work may be inputted ot judge the clearance between the tool and the work.

Further, in the servo system, there is the following relation among the droop, the feed velocity and the positional loop gain of the servo system:

$$KP = \frac{F}{D} \times \frac{1}{60}$$

where KP represents the positional loop gain (rad/sec), F represents the feed velocity (mm-min) and D represents the droop. Accordingly, in a circular-arcuate pass mode, as the droop becomes larger, (as the feed velocity becomes higher and as the positional loop gain becomes smaller), the pass has a tendency to approach a linear pass to thereby cause interference between the tool and the work.

Accordingly, in the rapid-traverse circular-arcuate pass mode, the gain is corrected by using the delay error parameter so that the droop becomes the same as that in the circular-arcuate cutting feed mode.

The numerical control apparatus is constructed as described above.

In the following, the operation is described in detail. The control position error parameter exclusively used for rapid traverse circular-arcuate pass and the delay error parameter are preliminarily set in the memories 11 and 12 from the board 19.

In FIG 9(A) the machining program is read by one block (Step 1), and then the presence of G codes in the block is checked (Step 2).

In the case where the block has no G code, modal G codes are checked to thereby determine whether a rapid-traverse circular-arcuate pass or not (Step 3). For example, the block of sequence number N030 is judged to be a rapid-traverse circular-arcuaste pass if the machining program is generated as follows.

| N020 G00.3 X-350 Y-200 R50 | Rapid-traverse CCW arc positioning. |
| N021 M08 | Coolant No.1 ON. |
| N022 M09 | Coolant OFF. |
| N030 X-300 Y-250 R50 | This means rapid-traverse CCW are positioning, though G00.3 does not exist as an address value. |

In Step 3, if the block is determined to not be a rapid-traverse circular-arcuate pass, such a determination excuted on other G codes. If the block is determined to be a rapid-traverse circular-arcuate pass, the rapid-traverse circular-arcuate pass subroutine is excuted (Step 5).

In Step 2, if a G code is present, the G code is judged whether it represents a rapid-traverse circular-arcuate pass or not (Step 4). If the code represents a rapid-traverse circular-arcuate pass, the processing of Step 5 is carried out. If the code does not represents a rapid-traverse circular-arcuate pass, determination is made for other G codes.

Figure 10:
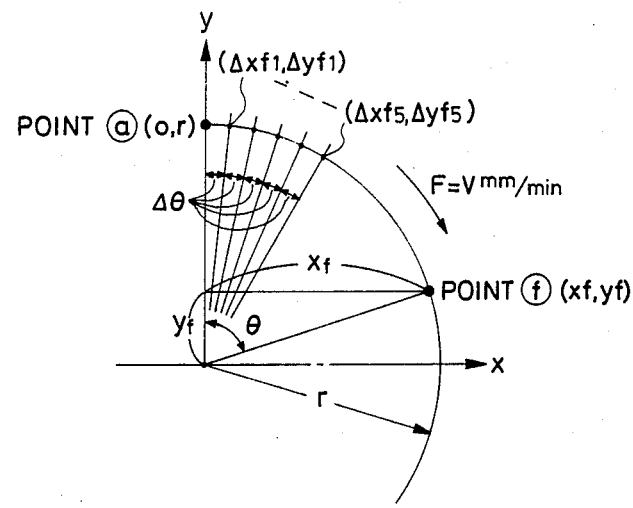
FIG. 10 is a view for explaining the computation for migration pass and migration distribution command in the embodiment.

In Step 5, the rapid-traverse circular-arcuate pass subroutine as shown in FIGS. 9(B) and 10 is executed. More particularly, in FIG. 9(B), the control position parameter stored in the memory 11 is read (Step 501). Then in Step 502, judgement is made as to whether the G code is either G00.2 (rapid-traverse CW arc positioning) or G00.3 (rapid-traverse CCW arc positioning). If the G code is either G00.2 or G00.3, a determination is made as to whether numerical data connected to the G code are X, Y and R (co-ordinated and radius) or not (Step 505). If the numerical data are X, Y and R, $\theta$ (angle between set points) is calculated (Step 9).

For example, in the case where the program input is G00.2 Xxf Yyf Rr [in the case of rapid-traverse circular-arcuate pass positioning from the point a to the point f in FIG. 7(1B) ], $\theta$ is calculated from the following equation (Refer to FIG. 10).

$$\theta = \cos^{-1} \frac{yf}{r} \text{ (deg)} \quad \text{(Equation 1)}$$

In Step 502, if the G code is neither G00.2 nor G00.3, judgejment is made in Step 503 as to whether the G code is either G02.0 (rapid-traverse CW arc positioning) or G03.0 (rapid-traverse CCW arc positioning). If the G code is either G02.0 or G03.0, the judgement of Step 505 is carried out.

Step 503, if the parameter is neither G02.0 nor G03.0, a determination is made in Step 504 whether the G code is either G02.1 (rapid-traverse CW arc equalized positioning) or G03.1 (rapid-traverse CCW arc equalized). If the G code is either G02.1 or G03.1, the calculation of $\theta$ of Step 509 is carried out. If the G code is neither G02.1 nor G03.1, error processing is carried out. In this case, the determination of Step 505 is unnecessary, because $\theta$ can be calculated from the equation $$0 = \frac{360}{Kn - 1}$$

when the program input of G02.1 and G03.1 is G02.1 Xx$_1$ Yy$_1$ Ir J$\theta$, Kn; G03.1 Xx$_1$ Yy$_1$ Ir J$\theta$, Kn; where Xx$_1$ and Yy$_1$ are the co-ordinates of the drilling hole circle, Ir is the radius of the drilling hole circle, J$_\theta$, is the angle between the drilling start point and the x-axis (COW direction is positive), and Kn is the number of drilling.

In Step 505, if the numerical data are not X, Y and R (coordinates and radius inputs), a determination is made in Step 506 as to whether the numerical data are X, Y, I and J coordinates and X-Y component parts or not. If the numerical data are X, Y, I and J, the calculation of r (radius) is carried out in Step 508 and then the calculation of $\theta$ is carried out in Step 509.

For example, in the case where the program input is G00.2 Xxf Yyf Iia Jja [in the case of a rapid-traverse circular-arcuate pass positioning from the point a to the point f in FIG. 7(2B)], r is calculated from the following equation (Refer to FIG. 10).

$$R = \sqrt{I^2 + J^2}$$

$$r = \sqrt{(ia)^2 + (ja)^2}$$

At the same time, $\theta$ is calculated from the aforementioned Equation 1.

In Step 506, if the numerical data are not X, Y, I and J, a determination is made in Step 507 as to whether the numerical data are $\theta$ and r angle and radius inputs or not. If the numerical data are $\theta$ and r, the processing of Step 510 (the processing for calculating MAX $\Delta\theta$) is carried out. If the numerical data are not $\theta$ and r, error processing is carried out. In this case, the calculation of $\theta$ in Step 509 is unnecessary, because $\theta$ has been given from the program.

Next, in Step 510, MAX $\Delta\theta$ is calculated from the following equation (Refer to FIG. 10). The term "MAX $\Delta\theta$" used herein is defined as an angle for maximum migration per unit time $\Delta t$, considering the control position error parameter (which shows the condition of the clearance between the tool and the wall of the work). In other words, MAX $\Delta\theta$ is a maximum migration angle in which the tool can be moved per unit time $\Delta t$ relative to the work withoput interference.

$$MAX \Delta\theta = 2 \cdot \cos \frac{-1R'}{R}$$

where R represents a radius of the rapid-traverse circular-arcuate pass, and R'=R−0.8 x control position error parameter (0.8 is a safety factor).

Next, in Step 511, $\Delta\theta$ is calculated by use of the following equations. (Refer to FIG. 10) The term "$\Delta\theta$" used herein means a migration angle per unit time $\Delta t$, without taking the control position error parameter into consideration.

For example, in the case where the program input is any one of G00.2 Xxf Yyf Rr, G00.2 Xxf Yyf Iia Jja and G00.2 $\theta_{\theta f}$of Rr (Refer to FIGS. 7(1B), 7(2B) and 7(3B)), $\Delta\theta$ is calculated as follows.

$$af = 2\pi r \cdot \theta/360 \text{ (mm)} \quad \text{(Equation 2)}$$

$$T = af \cdot 60/V \text{ (sec)} \quad \text{(Equation 3)}$$

$$N \approx T/\Delta t + 0.5 \text{ (divisor for arc af rounded)}$$

$$\Delta\theta = \theta/N \text{ (deg)} \quad \text{(Equation 5)}$$

where:
Rapid traverse speed: F=V mm/nin
Interrupt signal interval: IT=$\Delta t$ sec/cycle
Migration time of arc af: T Although the description has shown the case where Step 510 is performed prior to Step 511, Step 511 may be executed prior to Step 510.

Next, in Step 512, MAX $\Delta\theta$ and $\Delta\theta$ are compared with each other. In the case of MAX $\Delta\theta \geq \Delta\theta$, migration order values are calculated from the following equations (Step 513) using MAX $\Delta\theta$, because the tool and the work never interfere with each other if the tool is moved relative to the work at the migration angle of MAX $\Delta\theta$. (Refer to FIG. 10.)

$$\begin{aligned}
\Delta xf_1 &= r \sin MAX \Delta\theta \\
\Delta xf_2 &= r \sin 2 MAX \Delta\theta \\
\Delta xf_3 &= r \sin 3 MAX \Delta\theta \\
\Delta xf_n &= r \sin n MAX \Delta\theta
\end{aligned} \quad \text{Equation 6}$$

$$xf = r \sin \theta$$

$$\begin{aligned}
\Delta yf_1 &= r \cos MAX \Delta\theta \\
\Delta yf_2 &= r \cos 2 MAX \Delta\theta \\
\Delta yf_3 &= r \cos 3 MAX \Delta\theta \\
\Delta yf_n &= r \cos n MAX \Delta\theta
\end{aligned} \quad \text{Equation 7}$$

$$yf = r \cos \theta$$

The results $\Delta f_1, \Delta f_2, \ldots \Delta f_n \ldots$ f are fed as migration values for the x- and y-axis (Step 6).

In the case of MAX $\Delta\theta < \theta$ in Step 512, MAX $\Delta\theta$ is recalculated from the following equations (Step 514), because the tool and the work interfere with each other if the tool is moved relative to the work at the migration angle of MAX $\Delta\theta$.

$\theta/\text{MAX } \Delta\theta + 0.5 \approx N'$ (divisor for arc af rounded)

$\Delta\theta' = \theta/N'$

The migration order values are calculated from the following equations (Step 515) using $\Delta\theta'$, because the tool and the work never interfere with each other if the tool is moved at the migration angle of $\Delta\theta'$. (Refer to FIG. 10.)

$$\Delta x f_1 = r \sin \Delta\theta' \quad \Delta y f_1 = r \cos \Delta\theta'$$
$$\Delta x f_2 = r \sin 2\Delta\theta' \quad \Delta y f_2 = r \cos 2\Delta\theta'$$
$$\Delta x f_3 = r \sin 3\Delta\theta' \quad \Delta y f_3 = r \cos 2\Delta\theta'$$
$$\Delta x f_n = r \sin n\Delta\theta' \quad \Delta y f_n = r \cos n\Delta\theta'$$
$$\vdots \qquad \vdots$$
$$xf = r \sin \theta \quad yf = r \cos \theta$$

The results $\Delta f_1, \Delta f_2, \ldots \Delta f_n \ldots f$ are fed as migration values for the x- and y-axis, and then output power for driving the servomotors 16A and 16B. Consequently, a rapid-traverse circular-arcuate pass, for example approximately from the point (a) to the point (f), is executed.

The processing for the aforementioned calculation is made by the main control 10. If the servomotors 16A and 16B for respective control axes are operated through the servomotor control 13, the servo output controls 14A and 14B and the driving units 15A and 15B, then positioning using rapid-traverse circular-arcuate pass is carried out (Step 7). The migration distributing instruction is known, and detailed description thereof will be omitted.

Although description has been made in the case where the aforementioned calculation is processed by the main control 10, it is to be understood that the aforementioned calculation may be processed by the servo control 13 or by modules having the capability of processing the calculation, such as, for example, modules having fixed software as if the calculation was processed by the sub-CPU on hardware, and modules perfectly constructed by hardware and having the same function as that of the software of the aforementioned numerical control apparatus.

In execution of positioning using a rapid-traverse circular-arcuate pass, the condition is fed back to the servo control 13 through the detectors 17A and 17B and the feedback controls 18A and 18B. By reference to the delay error parameter stored in the second memory 12, the servo control 13 determined whether the current value of delay error is within the predetermined delay error set by the parameter or not (Step 8). If the current value is within the error, positioning is continued. If the current value is out of the error, the output of emergency stop os generated to stop the servomotors. The determination of the delay error in Step 8 is based on the necessity of considering positioning accuracy and the like.

Step 6, 7, 8 and 9 are repeated until the tool reaches its positioning point. When the tool reaches its positioning point, the migration distributing instruction is terminated so that positioning is finished.

According to the numerical control apparatus of the present invention, positioning is made based on such a rapid-traverse circular-arcuate pass as described above.

Figure 11A:
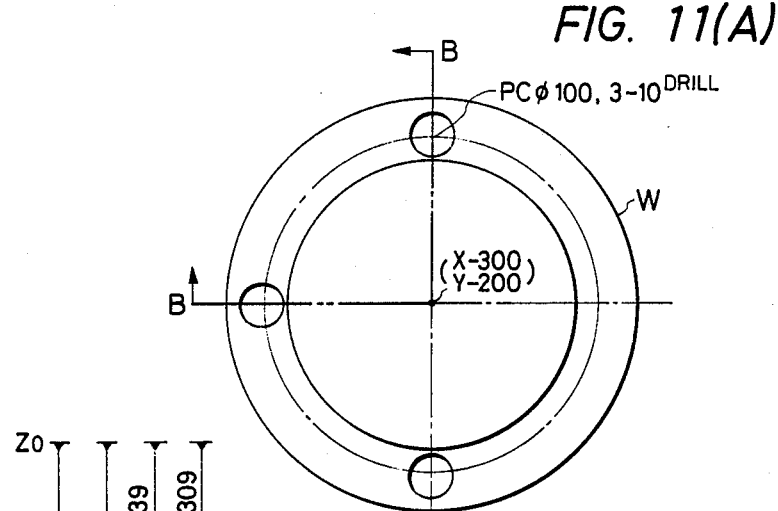
FIG. 11(A) is a plan view of the work showing an example of machining in the embodiment.
Figure 11B:
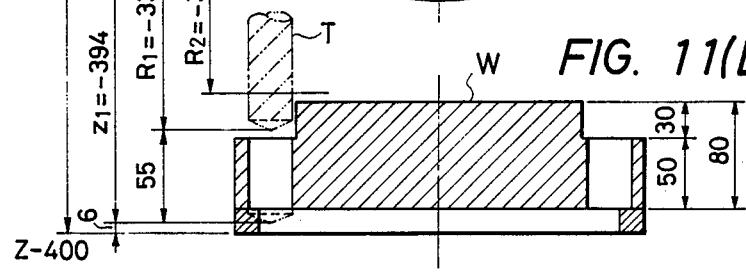
FIG. 11(B) is a sectional view taken along the line B—B of FIG. 11(A)

In the case where a work (W) having such a shape and a size as shown in FIG. 11 is to be bored at three positions by a drill (T), the machining program using he rapid traverse circular-arcuate pass mode according to the present invention is as follows, compared to the conventional machining program using the cutting feed mode

| <<Machining program according to the present invention>> | <<Machining program according to the prior art>> |
|---|---|
| N001 G28XOYOZO; | N001 G28XOYOZO; |
| N002 G90; | N002 G90; |
| N003 TnM06; | N003 TnM06; |
| N004 SnM03; | N004 SnM03; |
| N005 G99; | N005 G99; |
| N010 G00X-300.Y-150.; | N010 G00X-300.Y-150.; |
| N011 G00Z-339.; | N011 G81R-339.Z-394.; |
| N012 G01Z-394.; | N012 G80; |
| N013 G00Z-339.; | |
| N020 G00.3X-350.Y-200. R50.; | N020 G03X-350.Y-200.R50. |
| N021 G01Z-394.; | N021 G81R-339.Z-394.; |
| N022 G00Z-009.; | N022 G80; |
| N030 G00.3X-300.Y-250.R50.; | N030 G03X-300.Y-250.R50. |
| N031 G01Z-394.; | N031 G81R-339.Z-394.; |
| | N032 G80; |
| N040 G28ZO; | N040 G28ZO; |
| N041 G28XOYO; | N041 G28XOYO; |
| N042 M30; | N042 M30; |

It is apparent from the comparison between the two programs that the feed speed (modal value: the condition is kept as it is until the next instruction) (part surrounded by solid lines) can be set according to the present invention, and that input characters can be reduced in number (the invention: 173 characters, the prior art: 191 characters) even if the same work is drilled. Accordingly, the program generation can be improved in efficiency.

The meaning of the machining program is obvious from the above description, and the detailed description thereof will be omitted.

Although the aforementioned embodiment has shown the case where the machining program is generated according to the ISO/EIA word address format, it is a matter of course that the present invention is applicable to the case where the machining program is generated by an dialogue technique input method out of accordance with the ISO/EIA word address. In other words, the present invention is applicable to the case where input values to be established are the direction of positioning (for example, CW or CCW), the co-ordinates of the starting point (for example, Xs and Ys, or $\theta$s and Rs), the co-ordinates of the terminal point (for example, Xe and Ye or $\theta$e and Re), the number of machinings (for example, Nn/equalized angle An), the flag for machining the starting point (for example, 0/1), the radius (for example, Rn) and the like.

In the automatic programs inputted based on CRT according to dialogue technique, the drilling positions on the arc are inputted as follows.

Examples of the input method for respective items are shown as follows. (Refer to FIG. 12.)

| | I | II | III | IV | V | VI | VII |
|---|---|---|---|---|---|---|---|
| FIG.12(a) | CW | Xs | Ys | Xe | Ye | Nn | 1 | Rn | ← |
| FIG.12(b) | CW | Xs | Ys | Xe | Ye | An | 1 | Rn | ↑ |

-continued

| | I | II | III | IV | V | VI | VII |
|---|---|---|---|---|---|---|---|
| FIG.12(c) | CCW | Xs | Ys | Xe | Ye | Nn | 1 | Rn | ↓ |
| FIG.12(d) | CCW | Xs | Ys | Xe | Ye | An | 0 | Rn | → |
| FIG.12(e) | CW | θs | Rs | θe | Re | Nn | 1 | Rn | ← |
| FIG.12(f) | CW | θs | Rs | θe | Re | An | 0 | Rn | ↑ |
| FIG.12(g) | CCW | θs | Rs | θe | Re | Nn | 0 | Rn | ↓ |
| FIG.12(h) | CCW | θs | Rs | θe | Re | An | 0 | Rn | → |

I: the direction of positioning
II: the co-ordinates of the starting point
III: the co-ordinates of the terminal point
IV: the number of machinings/equalized angle
V: the flag for machining the starting point
VI: the radius
VII: the direction of the co-ordinates of the center point In the above table, if not $Rx=Re=Rn$ is not true, the program errors. Accordingly, Re and Rn can be omitted.

$\theta$ is calculated from the following equations using the input values, and then the calculation of distributing instruction is carried out by the equations 2 to 7.

$$\theta = [2*\sin^{-1}\{\sqrt{(Xs-Xc)^2-(Ys-Ye)^2}\}/2\,R]/Nn$$

$$\theta = An$$

$$\theta = (\theta s - \theta e)/Nn - 1$$

In the case of x-y coordinate input, the coordinates of the respective points are as follows.

| Starting point | Xs, Ys ... θ's |
|---|---|
| Second point | θ's + θ |
| Third point | θ's + 2θ |
| . | |
| . | |
| The nth point | θ's + nθ = θ'e ... Xe, Ye |

In the case of θ-R input, the co-ordinates of the repective points are as follows.

| Starting point | θs |
|---|---|
| Second point | θs + θ |
| Third point | θs + 2θ |
| . | |
| . | |
| The nth point | θs + nθ = θe |

Although the aforementioned embodiment has shown the case where positioning is made in the X- and Y-directions, the invention is applicable to the case where positioning is made in the X- and Z-directions or in the Y- and Z-directions.

Although the aforementioned embodiment has shown the case where positioning is made for preparation of drilling by a tool such as a drill and the like, it is a matter of course that the invention is not limited to such positioning for machine tool, and that the invention is applicable to other positioning for machinery such as laser machines, electric discharge machines, robots and the like.

For example, in the case where the invention is applied to laser machines, the invention can be used to prevent the interference between the laser head and the work (or obstacle) in positioning. Alternatively, for example, in the case where the invention is applied to electric discharge machines, the invention can be used to prevent the interference between the electrode and the work (or obstacle). Still alternatively, for example, in the case where the invention is applied to robots, the invention can be used to prevent the interference between the hand and the work (or obstacle).

What is claimed:

1. A numerical control apparatus which controls servomotors for driving respective control spindle heads to thereby perform positioning control of a tool or the like relative to a work to be processed or the like, said apparatus comprising:
    (a) means for determining whether an instruction in a machining program relates to a rapid-traverse circular-arcuate pass mode or not;
    (b) a computation means for computing a distance by which each of said servomotors is caused to move per unit time in the rapid-traverse circular-arcuate pass mode, when said determining means proves that said instruction in said machining program relates to the rapid-reaverse circular-arcuate pass mode; and
    (c) a servomotor control means for generating a signal for controlling each of said servomotors in accordance with the result of the computation by said computation means to cause said servomotors to perform the relative positioning in said rapid-traverse circular-arcuate pass mode.

2. A numerical control apparatus which controls servomotors for driving respective control spindle heads to thereby perform positioning control of a tool or the like relative to a work to be processed or the like, said apparatus comprising:
    (a) means for establishing both a control position error parameter exclusively used for a rapid-traverse circulate-arcuate pass mode and a delay error parameter;
    (b) means for determining whether an instruction in a machining program relates to a rapid-traverse circulate-arcuate pass mode or not;
    (c) a computation means for computing, taking said control position error parameter into consideration, a distance by which each of said servomotors is caused to move per unit time in the rapid-traverse circular-arcuate pass mode, when said determining means proves that said instruction in said machining program relates to the rapid-traverse circular-arcuate pass mode;
    (d) a servomotor control means for generating signal for controlling each of said servomotors in accordance with the result of the computation by said computation means to cause said servomotors to perform the relative positioning in said rapid-reaverse circular-arcuate pass mode; and
    (e) means for determining when said relative positioning is being carried out by said servomotors in said rapid-traverse circular-arcuate pass mode, whether said positioning is performed within a delay error established by said delay error parameter.

3. A numerical control apparatus according to claim 1 or 2, in which said machining program includes a machining program based on ISO/EIA word address format.

4. A numerical control apparatus according to claim 3, in which codes used in said machining program for instructing said rapid-traverse circular-arcuate pass mode include G codes.

5. A numerical control apparatus according to claim 4, in which said computation means includes means for determining whether numerical data in said machining program are inputs of co-ordinates and a radius, co-ordinate and X- and Y-components, or an angle and a radius.

* * * * *